(12) United States Patent
Hashimoto (10) Patent No.: US 8,864,232 B2
(45) Date of Patent: Oct. 21, 2014

(54) VEHICLE-SEAT CONTROL APPARATUS

(75) Inventor: Koji Hashimoto, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 551 days.

(21) Appl. No.: 13/180,478

(22) Filed: Jul. 11, 2011

(65) Prior Publication Data

US 2012/0007401 A1 Jan. 12, 2012

(30) Foreign Application Priority Data

Jul. 12, 2010 (JP) ................................. 2010-157874

(51) Int. Cl.
| | |
|---|---|
| A47C 1/00 | (2006.01) |
| B60N 2/02 | (2006.01) |
| B60N 2/18 | (2006.01) |
| B60N 2/06 | (2006.01) |
| B60N 2/24 | (2006.01) |
| B60N 2/22 | (2006.01) |

(52) U.S. Cl.
CPC ............ B60N 2/0232 (2013.01); B60N 2/0244 (2013.01); B60N 2/1803 (2013.01); B60N 2/06 (2013.01); B60N 2/24 (2013.01); B60N 2/22 (2013.01); B60N 2/181 (2013.01)
USPC ............ 297/344.13; 297/344.11; 297/344.15; 297/344.17

(58) Field of Classification Search
CPC .... B60N 2/0715; B60N 2/0705; B60N 2/167; B60N 2/1615; B60N 2/525; A47D 1/004
USPC ............... 297/344.13, 344.1, 344.11, 344.12, 297/344.15, 344.14, 344.17
See application file for complete search history.

(56) References Cited

U.S. PATENT DOCUMENTS

| | | | |
|---|---|---|---|
| 5,438,311 A * | 8/1995 | Lane, Sr. .................. | 340/426.11 |
| 6,347,778 B1 * | 2/2002 | Koga et al. .................... | 248/421 |
| 6,488,337 B1 * | 12/2002 | De Voss et al. .......... | 297/344.13 |
| 6,572,065 B2 * | 6/2003 | Koga et al. .................... | 248/421 |

(Continued)

FOREIGN PATENT DOCUMENTS

| | | |
|---|---|---|
| DE | 102004014421 | 10/2005 |
| JP | 03-189244 | 8/1991 |

(Continued)

OTHER PUBLICATIONS

Chinese Office Action for corresponding CN Application No. 201110180632.7, Dec. 12, 2013.

(Continued)

*Primary Examiner* — David R Dunn
*Assistant Examiner* — Alexander Harrison
(74) *Attorney, Agent, or Firm* — Mori & Ward, LLP (57) ABSTRACT

A vehicle-seat control apparatus includes an operation determination device, an exit determination device, a forward/backward adjusting device and a height adjusting device. The operation determination device is configured to determine whether a passenger operates a vehicle. The exit determination device is configured to determine whether the passenger exits the vehicle. The forward/rearward adjusting device is configured to move the vehicle seat rearward or forward according to a case where the passenger exits the vehicle or a case where the passenger operates the vehicle equipment. The height adjusting device is configured to move a rear part of the seat cushion to an upward state or move a front part of the seat cushion to a downward state when the passenger exits the vehicle.

6 Claims, 6 Drawing Sheets

(56) References Cited

U.S. PATENT DOCUMENTS

| | | | |
|---|---|---|---|
| 6,843,460 B2* | 1/2005 | Koga et al. | 248/421 |
| 7,278,686 B2* | 10/2007 | Yoshida | 297/338 |
| 7,290,834 B2* | 11/2007 | Christopher | 297/344.19 |
| 7,404,584 B2* | 7/2008 | Maruyama et al. | 296/65.08 |
| 7,533,936 B2* | 5/2009 | Ujimoto et al. | 297/344.13 |
| 7,686,339 B2* | 3/2010 | Rogers | 280/805 |
| 7,959,229 B2* | 6/2011 | Ishijima et al. | 297/358 |
| 8,155,848 B2* | 4/2012 | Kobayashi et al. | 701/66 |
| 8,269,512 B2* | 9/2012 | Ootaka | 324/686 |
| 2004/0262958 A1* | 12/2004 | Young et al. | 297/217.3 |
| 2004/0262969 A1* | 12/2004 | Sasaki et al. | 297/344.11 |
| 2006/0076164 A1* | 4/2006 | Nishio | 177/136 |
| 2007/0158988 A1* | 7/2007 | Yoshida | 297/344.14 |
| 2008/0116725 A1* | 5/2008 | Hawes et al. | 297/217.3 |
| 2008/0231094 A1* | 9/2008 | Okawa | 297/217.3 |
| 2009/0051198 A1* | 2/2009 | Ishikawa et al. | 297/217.2 |
| 2009/0127907 A1* | 5/2009 | Hoshi et al. | 297/344.12 |
| 2010/0140991 A1* | 6/2010 | Hassler et al. | 297/216.13 |
| 2010/0283303 A1* | 11/2010 | Alfredsson et al. | 297/344.13 |
| 2011/0068895 A1* | 3/2011 | Gee et al. | 340/5.67 |
| 2013/0161989 A1* | 6/2013 | Ito | 297/313 |

FOREIGN PATENT DOCUMENTS

| | | |
|---|---|---|
| JP | 3-271031 | 12/1991 |
| JP | 2007-185988 | 7/2007 |
| JP | 2007196948 A * | 8/2007 |

OTHER PUBLICATIONS

Japanese Office Action for corresponding JP Application No. 2010-157874, Dec. 10, 2013.

* cited by examiner

VEHICLE-SEAT CONTROL APPARATUS

CROSS-REFERENCE TO RELATED APPLICATIONS

The present application claims priority under 35 U.S.C. §119 to Japanese Patent Application No. 2010-157874 filed Jul. 12, 2010, entitled "Control Device For Vehicle Seat". The contents of this application are incorporated herein by reference in their entirety.

BACKGROUND OF THE INVENTION

1. Field of the Invention

The present invention relates to a vehicle-seat control apparatus.

2. Description of the Related Art

There is a known technique of automatically retracting a vehicle seat when a passenger is to exit a vehicle to increase the exiting space and increase the riding space for the next time a passenger rides the vehicle (for example, refer to Japanese Unexamined Patent Application Publication No. 2007-185988).

With such a technique, after riding the vehicle, the passenger operates an operator (ignition key, push starter, etc.) to automatically move the retracted seat forward to the driving position.

SUMMARY OF THE INVENTION

According to one aspect of the present invention, a vehicle-seat control apparatus includes an operation determination device, an exit determination device, a forward/backward adjusting device and a height adjusting device. The operation determination device determines whether a passenger operates a vehicle equipment provided forward with respect to a vehicle seat disposed in a vicinity of a doorway of a vehicle. The exit determination device determines whether the passenger exits the vehicle. The forward/rearward adjusting device moves the vehicle seat rearward in a case where the exit determination device determines the passenger exits the vehicle and moves the vehicle seat forward in a case where the operation determination device determines the passenger operates the vehicle equipment. The vehicle seat includes a seat cushion and a seat back. The height adjusting device moves a rear part of the seat cushion to an upward state or moves a front part of the seat cushion to a downward state in a period of time from a timing when the exit determination device determines the passenger exits the vehicle to a timing when the operation determination device determines the passenger operates the vehicle.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DESCRIPTION OF THE EMBODIMENTS

An embodiment of the present invention will be described below with reference to the drawings, wherein like reference numerals designate corresponding or identical elements throughout the various drawings.

Figure 1:
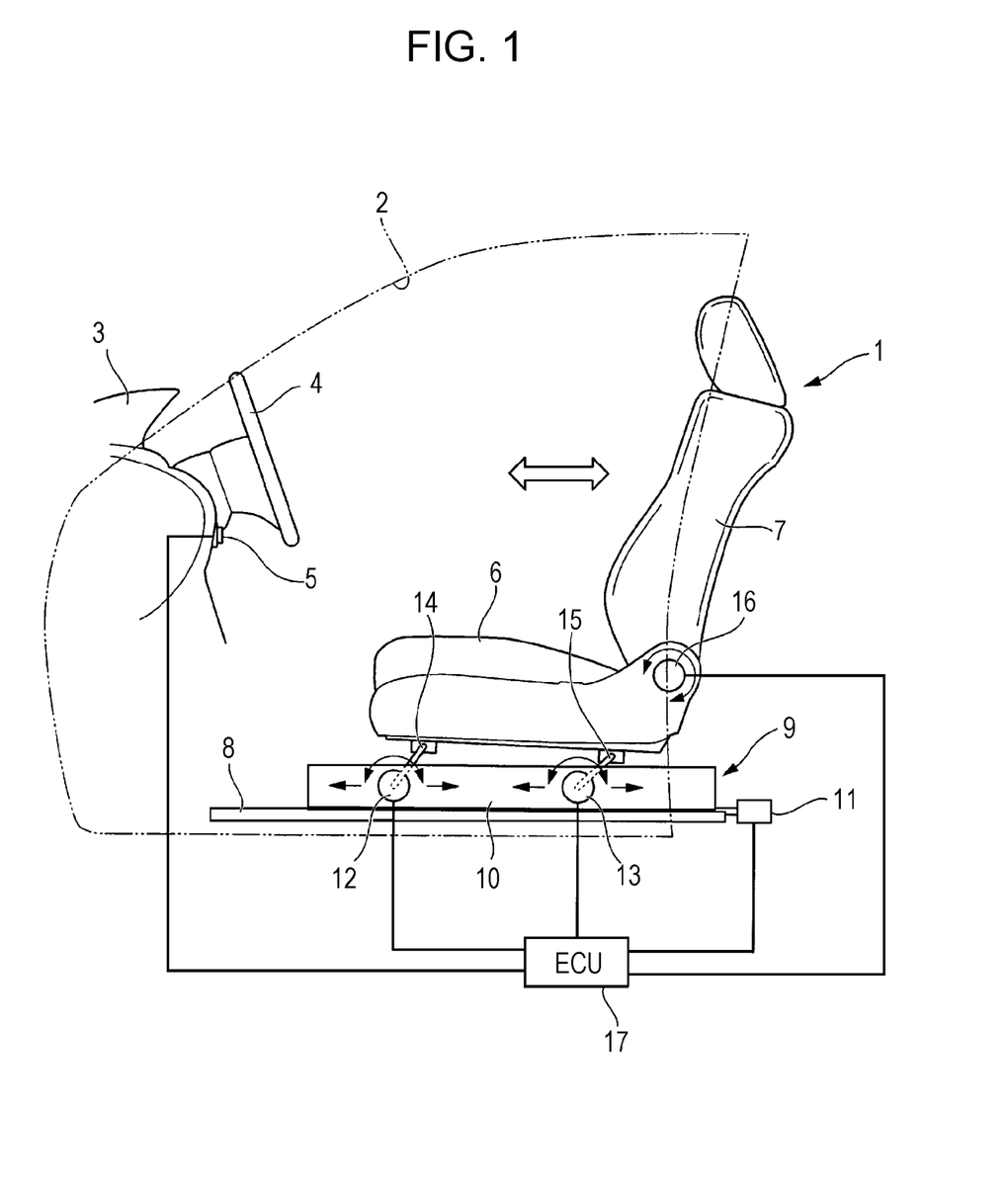
FIG. 1 illustrates the configuration of a vehicle seat controlled by a control device according to an embodiment of the present invention and the periphery of the vehicle seat.

FIG. 1 illustrates the configuration of a vehicle seat 1 controlled by a control device according to this embodiment and the periphery of the vehicle seat.

The front, rear, left, and right directions in the following description are the same as those directions of the vehicle.

The vehicle seat 1 is disposed near a doorway 2 for a passenger provided in the vehicle.

An instrumental panel 3 is disposed forward of the vehicle seat 1. A steering wheel 4 is disposed on the instrumental panel 3.

A pressing-type ignition switch 5 is disposed on the instrumental panel 3 near the steering wheel 4.

The engine is started by operating the ignition switch 5.

The vehicle seat 1 has a seat cushion 6 on which the passenger is seated and a seat back 7, which supports the upper body of the passenger seated on the seat cushion 6 from the back.

The seat cushion 6 is attached on a seat sliding device 9 disposed on the vehicle floor 8.

The seat sliding device 9 includes a slider 10, which is disposed along the surface of the vehicle floor 8, and supports the seat cushion 6 and a forward/rearward adjustment motor 11, which moves the slider 10 frontward or rearward.

The vehicle seat 1 moves forward or rearward in accordance with the driving of the forward/rearward adjustment motor 11.

A cushion-front-part adjustment motor 12, which adjusts the height of the front part of the seat cushion 6, is disposed on the front part of the slider 10, and a cushion-rear-part adjustment motor 13, which adjusts the height of the rear part of the seat cushion 6, is disposed on the rear part of the slider 10.

The cushion-front-part adjustment motor 12 and the front part of the seat cushion 6 are connected with a linking member 14. The cushion-front-part adjustment motor 12 and the rear part of the seat cushion 6 are connected with a linking member 15.

The linking member 14 slides vertically in accordance with the driving of the cushion-front-part adjustment motor 12 to vertically move the front part of the seat cushion 6.

The linking member 15 slides vertically in accordance with the driving of the cushion-rear-part adjustment motor 13 to vertically move the seat cushion 6.

The cushion-front-part adjustment motor 12 and the cushion-rear-part adjustment motor 13 can move in the forward or rearward on the slider 10.

The seat back 7 is supported by the rear edge of the seat cushion 6 in such a manner that the inclination angle of the seat back 7 is variable.

A reclining motor 16, which changes the orientation of the seat back 7, is disposed on the connecting part of the seat back 7 and the seat cushion 6.

The inclination angle of the seat back 7 with respect to the seat cushion 6 changes in accordance with the driving of the reclining motor 16.

An ECU 17 is a control device and is electrically connected to the ignition switch 5, the forward/rearward adjustment motor 11, the cushion-front-part adjustment motor 12, the cushion-rear-part adjustment motor 13, and the reclining motor 16.

The ECU 17 outputs instructions to the motors 11, 12, 13, and 16 in response to the passenger operating the ignition switch 5 and a seat adjustment switch (not shown).

Accordingly, the ECU 17 controls the position and orientation of the vehicle seat 1.

The ECU 17 according to this embodiment adjusts the position of the vehicle seat 1 when it is determined that the passenger has a desire to exit the vehicle.

The process carried out by the ECU 17 when a passenger exits the vehicle will be described with reference to the flow chart illustrated in FIG. 2.

In Step S1, the ECU 17 detects whether the ignition switch 5 has been turned off.

In this way, the ECU 17 determines whether the passenger has a desire to exit the vehicle.

When the ignition switch 5 is turned off and it is determined that the passenger has a desire to exit the vehicle, in Step S2, the ECU 17 determines whether a predetermined amount of time has elapsed.

After the predetermined amount of time has elapsed, in Step S3, the forward/rearward adjustment motor 11 is driven to retract the cushion-front-part adjustment motor 12.

It is desirable that the "predetermined amount of time" in Step S2 is 0 seconds or a relatively small amount of time.

Before the vehicle seat 1 is retracted in Step S3, the position of the vehicle seat 1 in the front-to-rear direction, the height of the seat cushion 6, and the inclination angle of the seat back 7 are stored in the ECU 17.

The retraction distance of retracting the vehicle seat 1 in Step S3 is set in advance.

In Step S4, the ECU 17 drives the cushion-rear-part adjustment motor 13 to change the orientation of the seat cushion 6.

Specifically, in Step S4, the ECU 17 drives the cushion-rear-part adjustment motor 13 to move the rear part of the seat cushion 6 upward and adjust the rear part of the seat cushion 6 to be higher than the front part of the ignition switch 5.

When a passenger rides the vehicle after the vehicle seat 1 is retracted through the above-described process, the ECU 17 carries out a process of returning the vehicle seat 1 to the original position.

Figure 3:
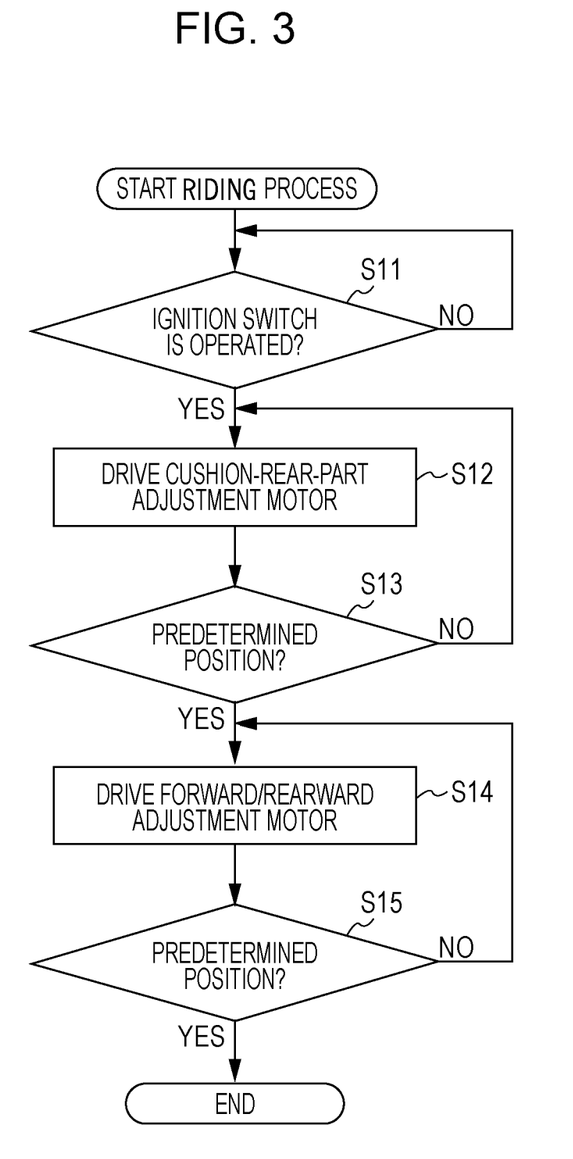
FIG. 3 is a flow chart illustrating a process carried out by a control device according an embodiment when a passenger rides a vehicle.

FIG. 3 is a flow chart illustrating a process carried out by the ECU 17 when a passenger rides the vehicle.

The process is described below.

In Step S11, the ECU 17 detects the operation of the ignition switch 5.

In this way, the ECU 17 determines that a passenger has ridden the vehicle.

When it is determined that a passenger has ridden the vehicle, in Step S12, the ECU 17 retrieves the position of the vehicle seat 1 in the front-to-rear direction, the height of the seat cushion 6, and the inclination angle of the seat back 7 stored in Step S3 before retraction, drives the cushion-front-part adjustment motor 12, and adjusts the seat cushion 6 to the stored height.

The ECU 17 confirms, in Step S13, that the height of the seat cushion 6 is the predetermined height and, in Step S14, drives the forward/rearward adjustment motor 11 to adjust the seat cushion 6 to the stored position.

In Step S15, the ECU 17 confirms that the position of the seat cushion 6 is the predetermined position, and the process ends.

Figure 2:
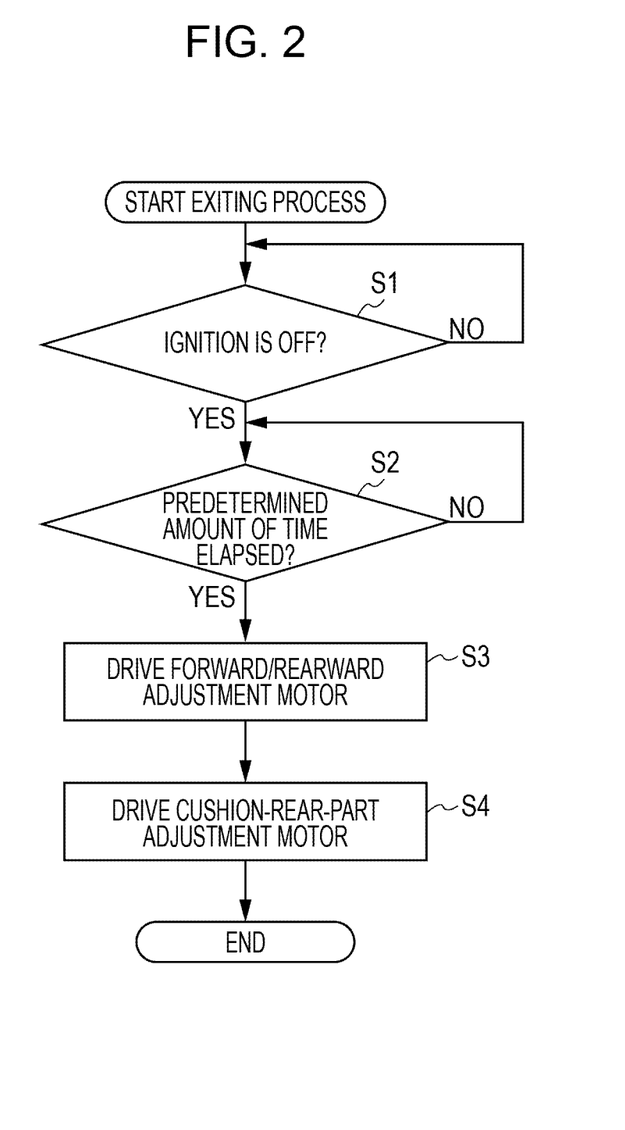
FIG. 2 is a flow chart illustrating a process carried out by a control device according an embodiment when a passenger exits a vehicle.
Figure 4:
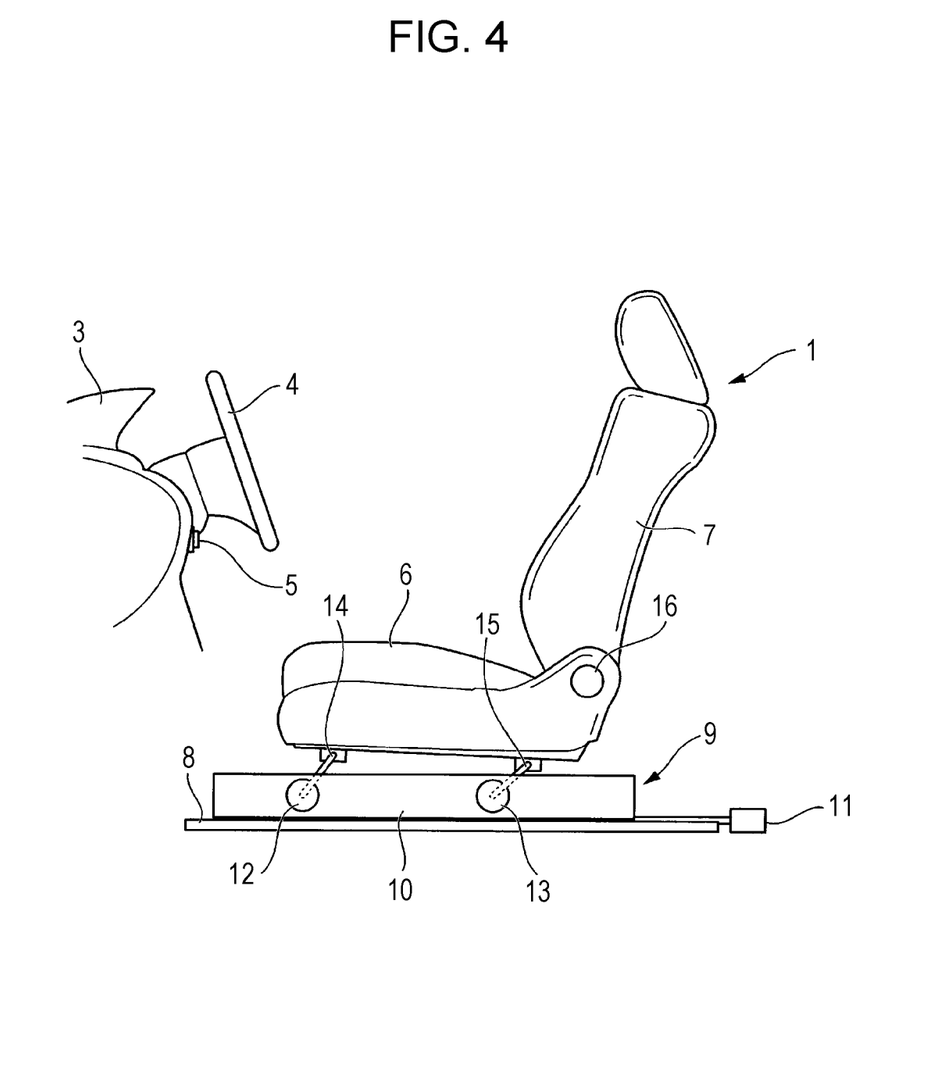
FIG. 4 illustrates a vehicle seat before the process carried out by a control device when a passenger exits a vehicle is carried out.
Figure 5:
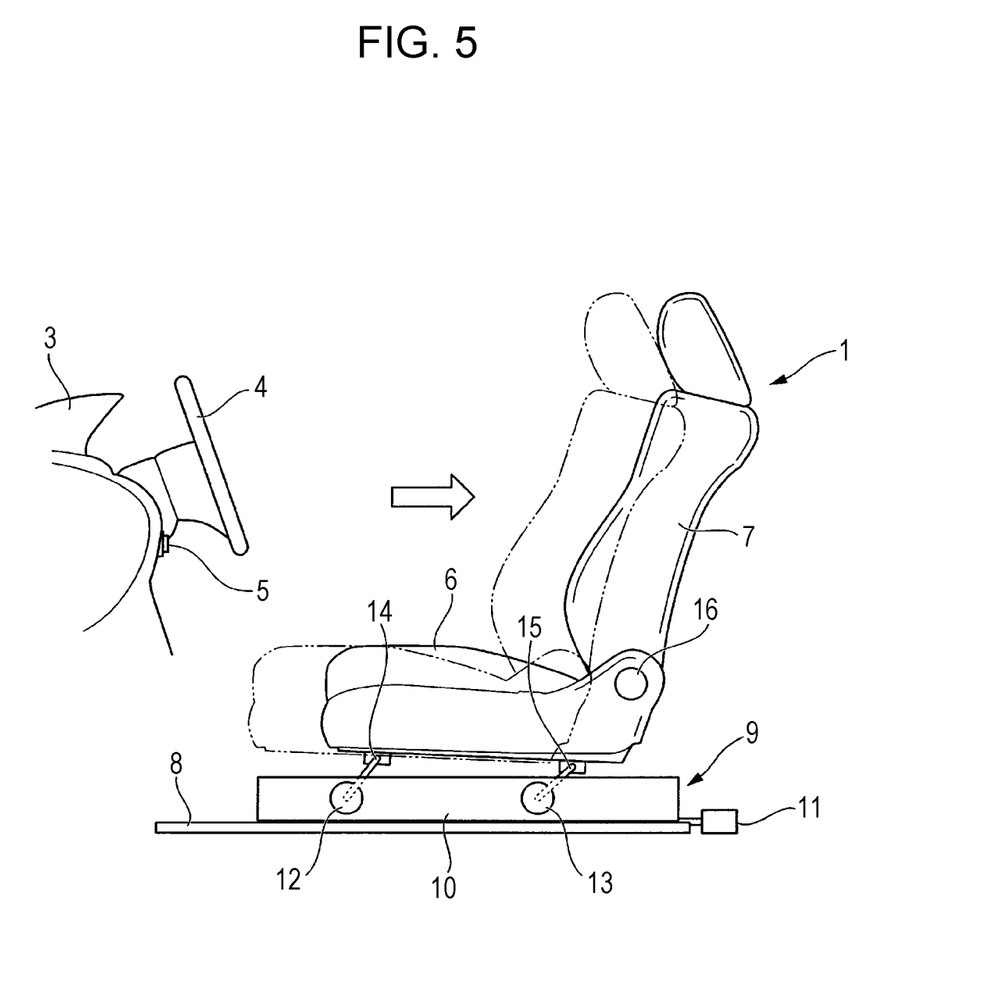
FIG. 5 illustrates a vehicle seat controlled in accordance with the process carried out by a control device when a passenger exits a vehicle.
Figure 6:
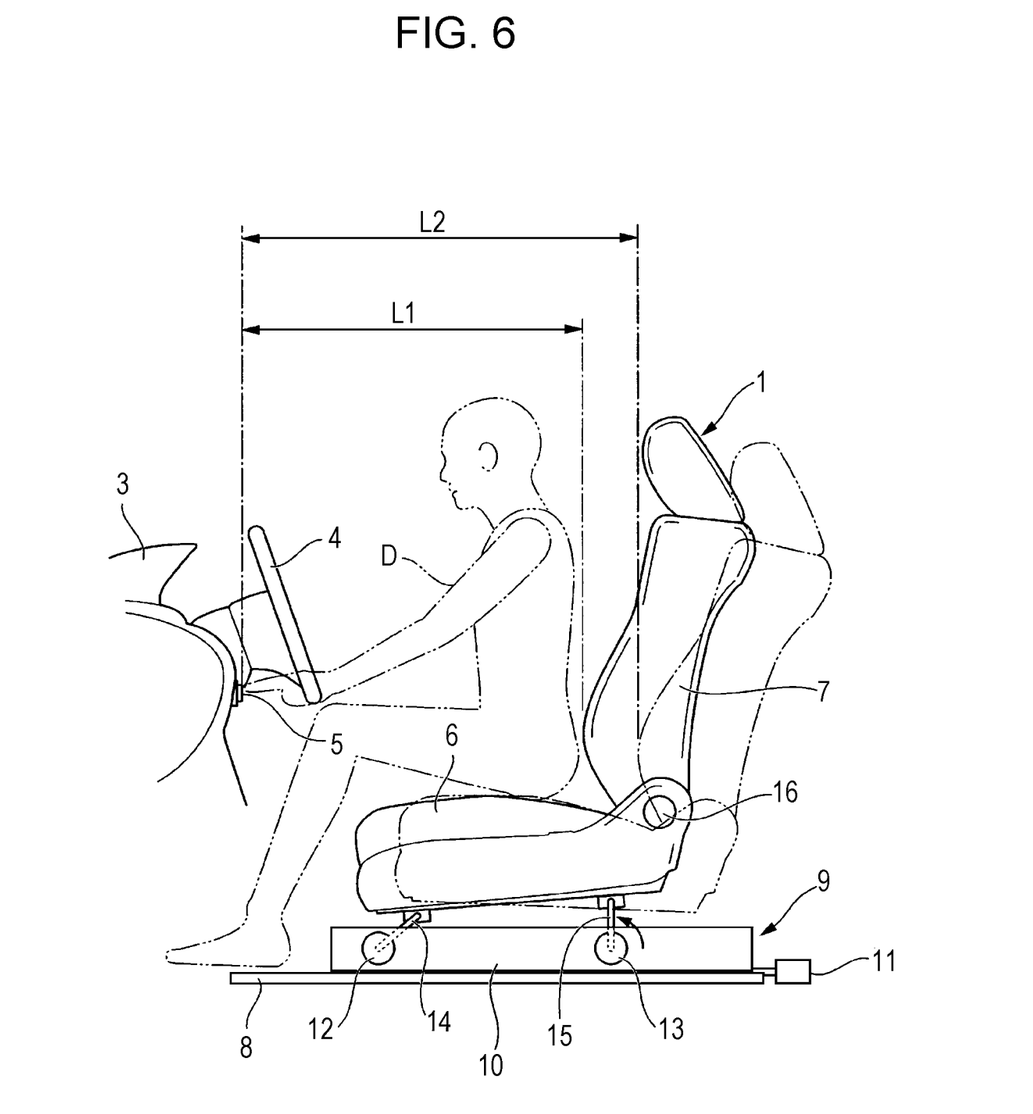
FIG. 6 illustrates a vehicle seat controlled in accordance with the process carried out by a control device when a passenger exits a vehicle.

FIGS. 4 to 6 illustrate the position and orientation of the vehicle seat 1 changing in according with the process carried out by the ECU 17 when the passenger exits the vehicle, which is illustrated in FIG. 2.

The change in position and orientation of the vehicle seat 1 will be described in more detail with reference to FIGS. 4 to 6.

FIG. 4 illustrates the position and orientation of the vehicle seat 1 (in an operating mode) before the desire of the passenger to exit the vehicle is confirmed.

Upon confirming that the ignition switch 5 has been turned off (S1), the vehicle seat 1 is retracted as illustrated in FIG. 5 (S3).

As the vehicle seat 1 is retracted to the predetermined position, the rear part of the seat cushion 6 is moved upward, as illustrated in FIG. 6 (S4).

The position and orientation are maintained until next time a passenger rides the vehicle.

With the rear part of the seat cushion 6 moved upward, the distance of the seat back 7 and the ignition switch 5 becomes small, as apparent from comparing L1 and L2 in FIG. 6.

Thus, the passenger D, as illustrated in the drawing, can easily operate the ignition switch 5.

Since the retracted position of the vehicle seat 1 is maintained to ensure an exiting space, the passenger D can easily exit the vehicle.

According to this embodiment as described above, the height of the seat cushion 6 is adjusted in the time period between exiting the vehicle and riding the vehicle.

In this way, even when the vehicle seat 1 is retracted when a passenger exits the vehicle, the distance between the passenger seated in the vehicle seat 1 and the ignition switch 5 is reduced to facilitate the operation of the ignition switch 5 when a passenger rides the vehicle.

According to this embodiment, the height of the seat cushion 6 is adjusted when the passenger exits the vehicle (when the desire of the passenger to exit the vehicle is confirmed). In this way, the passenger is guided in a direction to sit up, and thus, it is easier to exit the vehicle.

According to this embodiment, the height of the seat cushion 6 is adjusted when the passenger exits the vehicle (when the desire of the passenger to exit the vehicle is confirmed). The height of the seat cushion 6, however, may be adjusted any time between exiting the vehicle and riding the vehicle again. For example, the height of the seat cushion 6 may be adjusted when a door provided in the doorway 2 is opened (when the desire of the passenger to exit the vehicle is confirmed) or when the passenger exits the vehicle and then closes the door.

In this way, the next time a passenger is seated in the vehicle seat 1, the distance from the passenger to the ignition switch 5 can be reduced.

In this embodiment, the rear part of the seat cushion 6 is moved upward to adjust the rear part of the seat cushion 6 to be higher than the front part of the seat cushion 6. In this way, the distance between the passenger and the ignition switch 5 can be reduced even more reliably.

To adjust the rear part of the seat cushion 6 to be higher than the front part of the seat cushion 6, the cushion-front-part adjustment motor 12 may be driven to move the front part of the seat cushion 6 downward.

The front part of the seat cushion 6 may be moved downward and the rear part of the seat cushion 6 may be moved upward by simultaneously driving the cushion-front-part adjustment motor 12 and the cushion-rear-part adjustment motor 13.

In addition to adjusting the rear part of the seat cushion 6 higher than the front part of the seat cushion 6, the seat back 7 may be inclined forward.

In this embodiment, a motor and a linking member have been described as an adjusting unit that adjusts the height of the seat cushion 6. The configuration is not limited thereto, and the adjusting unit may have another configuration.

According to the embodiment of the present invention, an operation determination device includes, for example, an ignition switch 5 and an ECU 17. An exit determination device includes, for example, an ECU 17. A forward/rearward adjusting device includes, for example, slider 10 and forward/rearward adjustment motor 11. A height adjusting device includes, for example, a cushion-front-part adjustment motor 12, a cushion-rear-part adjustment motor 13 and linking members 14 and 15.

The embodiment of the present invention provides a vehicle-seat control device, which moves a vehicle seat (for example, a vehicle seat 1) including a seat cushion (for example, a seat cushion 6) and a seat back (for example, a seat back 7) and being disposed near a doorway (for example, a doorway 2) of a vehicle rearward when a passenger exits the vehicle and moves the vehicle seat forward in accordance with operation of an operator (for example, ignition switch 5) disposed on vehicle equipment provided forward of the vehicle seat when the passenger rides the vehicle, the control device including a height adjusting unit (for example, an ECU 17) moving a rear part of the seat cushion to an upward state or moving a front part of the seat cushion to a downward state in a time period between a passenger exiting the vehicle and a passenger riding the vehicle.

According to the embodiment of the present invention, since the height of the seat cushion is adjusted, even when the vehicle seat is retracted when the passenger exits the vehicle, the distance between a seated passenger and the operator can be reduced to facilitate operation of the operator when a passenger rides the vehicle.

According to the embodiment of the present invention, the height adjusting unit may move the rear part of the seat cushion to the upward state or moves the front part of the seat cushion to the downward state when a passenger exits the vehicle and may maintain the seat cushion in the upward state or downward state until next time a passenger rides the vehicle.

According to the embodiment of the present invention, since the height of the seat cushion is adjusted when the passenger exits the vehicle, the passenger can easily exit the vehicle.

According to the embodiment of the present invention, the height adjusting unit may adjust the seat cushion so as to set the rear part of the seat cushion higher than the front part of the seat cushion.

According to the embodiment of the present invention, the distance between the passenger and the operator can be reliably reduced.

Obviously, numerous modifications and variations of the present invention are possible in light of the above teachings. It is therefore to be understood that within the scope of the appended claims, the invention may be practiced otherwise than as specifically described herein.

What is claimed is:

1. A vehicle-seat control apparatus comprising:
an operation determination device configured to determine whether a passenger operates a vehicle equipment that is provided forward of a vehicle seat in a vehicle, the vehicle seat being disposed in a vicinity of a doorway of the vehicle, the vehicle seat including a seat cushion and a seat back;
an exit determination device configured to determine whether the passenger exits the vehicle;
a forward/rearward adjusting device configured to move the vehicle seat rearward in a case where the exit determination device determines the passenger exits the vehicle and to move the vehicle seat forward in a case where the operation determination device determines the passenger operates the vehicle equipment; and
a height adjusting device configured to move a rear part of the seat cushion to an upward state or to move a front part of the seat cushion to a downward state so as to shorten a distance between the passenger and the vehicle equipment in a period of time from a timing when the exit determination device determines the passenger exits the vehicle to a timing when the operation determination device determines the passenger operates the vehicle,
wherein the height adjusting device is configured to move the rear part of the seat cushion to the upward state or to move the front part of the seat cushion to the downward state when the exit determination device determines the passenger exits the vehicle, and
wherein the height adjusting device is configured to maintain a state where the rear part of the seat cushion is moved to the upward state or a state where the front part of the seat cushion is moved to the downward state until the operation determination device determines the passenger operates the vehicle.

2. The vehicle-seat control apparatus according to claim 1, wherein the height adjusting device is configured to set the rear part of the seat cushion higher than the front part of the seat cushion.

3. The vehicle-seat control apparatus according to claim 1, further comprising:
a storing device to store a position of the vehicle seat in a front-to-rear direction, a height of the seat cushion, and an inclination angle of the seat back before the forward/rearward adjusting device moves the vehicle seat rearward.

4. The vehicle-seat control apparatus according to claim 1, wherein forward/rearward adjusting device comprises:
a slider slidably disposed along a floor of the vehicle, the vehicle seat being supported by the slider; and
a forward/rearward adjustment motor configured to move the slider in forward and rearward directions.

5. The vehicle-seat control apparatus according to claim 4, wherein the height adjusting device comprises:
a front-part adjustment motor provided on the slider;
a front linking member connecting the front-part adjustment motor to the front part of the seat cushion;
a rear-part adjustment motor provided on the slider; and
a rear linking member connecting the rear-part adjustment motor to the rear part of the seat cushion,
wherein the front-part adjustment motor is configured to drive the front linking member to vertically move the front part of the seat cushion, and
wherein the rear-part adjustment motor is configured to drive the rear linking member to vertically move the rear part of the seat cushion.

6. The vehicle-seat control apparatus according to claim 1, wherein the height adjusting device comprises:
- a front-part adjustment motor;
- a front linking member connecting the front-part adjustment motor to the front part of the seat cushion;
- a rear-part adjustment motor; and
- a rear linking member connecting the rear-part adjustment motor to the rear part of the seat cushion,
- wherein the front-part adjustment motor is configured to drive the front linking member to vertically move the front part of the seat cushion, and
- wherein the rear-part adjustment motor is configured to drive the rear linking member to vertically move the rear part of the seat cushion.

* * * * *